Figure 1:
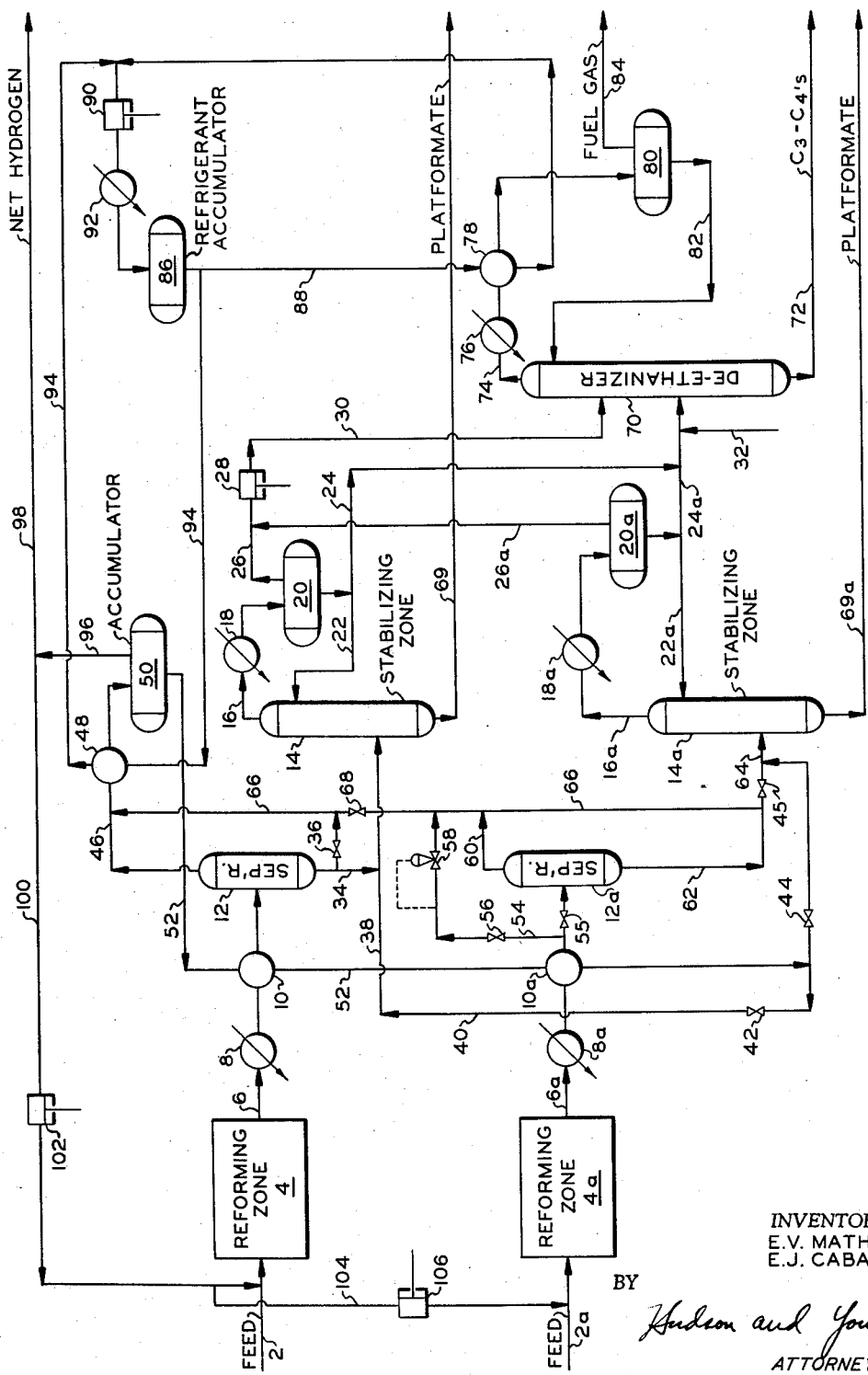

April 5, 1960

E. V. MATHY ET AL

2,931,768

PROCESSING OF HYDROCARBONACEOUS MATERIALS
IN THE PRESENCE OF HYDROGEN

Filed Sept. 12, 1957

2 Sheets-Sheet 1

INVENTORS
E.V. MATHY
E.J. CABANAW

BY
Hudson and Young
ATTORNEYS

United States Patent Office 2,931,768
Patented Apr. 5, 1960

2,931,768

PROCESSING OF HYDROCARBONACEOUS MATERIALS IN THE PRESENCE OF HYDROGEN

Eugene V. Mathy, Bartlesville, Okla., and Eldred J. Cabanaw, Woods Cross, Utah, assignors to Phillips Petroleum Company, a corporation of Delaware Application September 12, 1957, Serial No. 683,610

2 Claims. (Cl. 208—79)

This invention relates to the processing of hydrocarbonaceous materials in the presence of hydrogen. In one carbonaceous materials under differing conditions of pressure in the presence of hydrogen. In another aspect it relates to a method for reforming two hydrocarbon fractions in the presence of hydrogen under different operating conditions of pressure to obtain two hydrocarbon products.

In recent years, the use of hydrogen in conjunction with the processing of hydrocarbonaceous materials, has increased manyfold. Today, particularly in the petroleum industry, hydrogen is widely used for the desulfurziation of petroleum fractions, for reforming of naphthas and gasolines and for the hydrogenation of unsaturated hydrocarbons. One of the problems associated with the use of hydrogen in these and other commercial applications, is the handling of the large quantities of this material required, and particularly the separation and recovery of hydrogen from various process effluent streams. Because of the quantities of hydrogen required, recovery and reuse of this material is an economic necessity in many processes. Involved in the recovery of hydrogen are expensive equipment, including numerous vessels, coolers, pumps, etc.

It is an object of this invention to provide an improved process for the treatment of hydrocarbonaceous materials in the presence of hydrogen.

Another object of this invention is to provide an improved process for treating two or more hydrocarbonaceous materials in the presence of hydrogen under different pressures.

Still another object of this invention is to provide an improved method for recovering hydrogen employed in the treatment of two or more hydrocarbonaceous materials under different pressures.

Yet another object of this invention is to provide an improved process for reforming two or more hydrocarbon fractions under different pressures in the presence of hydrogen.

These and other objects of the invention will become more readily apparent from the following detailed description and discussion.

In their broad aspect, the foregoing objects are achieved by processing at least two hydrocarbonaceous materials in separate zones in the presence of hydrogen under different pressures, removing an effluent product stream from each of said zones, separating a hydrocarbon-rich stream from at least one of the effluent streams, combining separated hydrogen-rich material with at least a liquid portion of the other effluent stream whereby the combined material contains hydrogen from the several effluent streams, cooling the combined material, separating therefrom a stream of increased hydrogen content, stabilizing the liquid remaining to provide a liquid product, stabilizing the liquid portion of the other effluent stream to provide a second liquid product and recycling a hydrogen-rich stream to each processing operation.

In one aspect of the invention, the recycle hydrogen to each processing operation comprises the hydrogen-rich stream separated from the effluent stream leaving said operation.

In another aspect of the invention, the recycle hydrogen is obtained from the stream of increased hydrogen content.

In still another aspect of the invention, effluent from one processing operation containing hydrogen is combined with a hydrogen-rich stream separated from the other effluent and the mixture is treated in accordance with the foregoing aspects of the invention.

In yet another aspect of the invention, the overhead material from each stabilizing operation is condensed to provide reflux for said operation, the net condensates from the stabilization operations are combined, the uncondensed vapors from the stabilization operation are combined, compressed, and the said condensates and vapors are fractionated to obtain light hydrocarbon products.

In one feature of the latter aspect of the invention, the combined vapors and combined condensates are introduced at different levels in the fractionation zone.

This invention finds general application in the treatment of hydrocarbonaceous materials in the presence of hydrogen wherein two or more hydrocarbonaceous materials are processed at different pressures. Specifically the invention can be used in various hydrocarbon processes such as reforming, desulfurization, dehydrogenation, hydrogenation, etc., and can be used in the treatment of individual hydrocarbons and hydrocarbon fractions including gasolines, naphthenes, kerosenes, crude oils, etc. The invention also finds application in the treatment of other carbonaceous materials, such as in the destructive hydrogenation of coal tars. The invention in its various embodiments can be employed in processes wherein there is either a net production or a net consumption of hydrogen or in processes wherein the quantity of hydrogen neither increases nor decreases. The following discussion is directed to an application of the invention to the reforming of naphtha or gasoline fractions. However, this is not intended in any limiting sense and it is within the scope of the invention to employ the various processes and feed materials set forth above.

The reforming of gasolines or naphthas in the presence of hydrogen is usually carried out over a range of temperature between about 775 and about 1025° F. The pressure, which is dependent primarily on the partial pressure of the hydrogen employed in the process, can vary from as low as about 1 to as high as about 55 atmospheres. The hydrogen circulation rate also can vary over a wide range but is usually from about 900 to about 8000 cubic feet per barrel of liquid charged. The reforming operation can be carried out either in a fixed bed or as a fluid type process. When operating in a fixed bed, it is usually desirable to employ a space velocity varying from between about 0.5 to about 5 volumes of liquid per volume of catalyst per hour. When utilizing a fluidized circulating catalyst bed, it is desirable to maintain the weight hourly space velocity in the reaction zone between about 0.25 and about 0.90 pound of feed per hour per pound of catalyst and the catalyst to oil weight ratio can vary from between about 0.25 to about 1.0. Catalysts which can be employed in the process includes the chromia-alumina type, molybdena-alumina type, etc. and also platinum-containing catalysts, all of which are well known to those skilled in the art. Various hydrocarbon fractions can be reformed, however, usually it is desirable that the feed material have an initial ASTM boiling point of between about 75 and about 275° F. and an ASTM end point of between about 350 and about 475° F.

In carrying out the invention in one embodiment thereof, two feed materials such as petroleum naphthas are introduced to separate reforming zones wherein they are contacted with hydrogen under reforming conditions at different pressures. The effluent streams from the reforming zones are introduced to separators wherein separation is effected between the liquid products and gaseous materials. The overhead from each separator, comprising a gaseous mixture of hydrogen and liquid hydrocarbons, is combined with the liquid fraction from one of the separators, and the mixture is cooled and passed to an accumulation zone. When the combined gases and liquid are cooled a portion of the light gaseous hydrocarbons are dissolved in the liquid thereby increasing the hydrogen content of the uncondensed material. The cooled gas of increased hydrogen content is removed from the accumulation zone and recycled to the reforming zones. Inasmuch as the zones operate at different pressures, it is desirable to first increase the gas in pressure sufficient for introduction to the lower pressure reforming zone and then further compress the remaining gas for introduction to the higher pressure reforming zone. If the process is such that an excess of hydrogen is obtained over that required for recycle to the reforming zones, said excess can be yielded as product.

The liquid from the accumulation zone is stabilized to provide a liquid product of increased octane value. The liquid from the other separation zone is also stabilized to provide a separate liquid product of increased octane number. The gases obtained in the two stabilizing operations are partially condensed and a portion of the liquid is utilized as reflux in each operation. The remaining condensates are combined, as are also the uncondensed vapors from the two stabilizations. These materials are introduced to a de-ethanizing tower wherein separation is effected between normally gaseous hydrocarbons and propane and butane. The liquid and gas streams from the stabilizing zones can be introduced to the de-ethanizing zone as a combined feed, however, usually it is preferred that they be introduced separately to trays where the compositions are similar to the feed materials.

In the preceding embodiment, all of the hydrogen in the effluent streams from the reforming zones is processed to provide a more pure hydrogen stream. However, it is also within the scope of the invention to purify only the net hydrogen yield from the process. When operating in accordance with this embodiment of the invention a portion of the gases from each separation zone is recycled to the corresponding reforming zone and the remainder of the gases are processed in accordance with the aforedescribed operation.

In still another embodiment of the invention, one of the separation zones can be eliminated and the hydrogen-rich stream from the single separation zone can be combined with the total effluent from the other reforming zone.

It should be apparent from the preceding discussion that the methods of this invention provide a number of advantages over the prior art. For example, by combining the hydrogen rich gases from each unit with the liquid effluent from one of the units, it is possible to recover and concentrate the hydrogen present therein in a single recovery system. This not only eliminates duplication of equipment but also substantially reduces the amount of cooling required since only a portion of the liquid from the several reaction zones is cooled in the purification of the hydrogen. In addition to reducing the equipment and energy required for hydrogen purification, this invention also simplifies treatment of the liquid products from the several reaction zones by treating the materials recovered from the stabilized products in a single recovery system. By the methods of this invention, any number of processes can be operated in parallel to provide individual stabilized products, with provision for only a single hydrogen and light gas recovery system.

The preceding discussion has been directed to a process wherein there is a net production of hydrogen; however, the invention is also applicable to processes wherein there is a net consumption of hydrogen or wherein hydrogen is neither consumed nor produced. Thus the invention finds value in general in processes wherein hydrogen recycle is employed and wherein it is desirable to provide a hydrogen stream of increased purity. As previously stated, the invention can also be used in various other processes including desulfurization. In the desulfurization process, it is usually necessary to remove hydrogen sulfide from the reaction effluent. This can be effected within the scope of the invention by providing an additional separation zone following each reaction. While generally applicable to catalytic processes, the invention is not limited thereto, and can also be used in non-catalytic operations.

Figure 2:
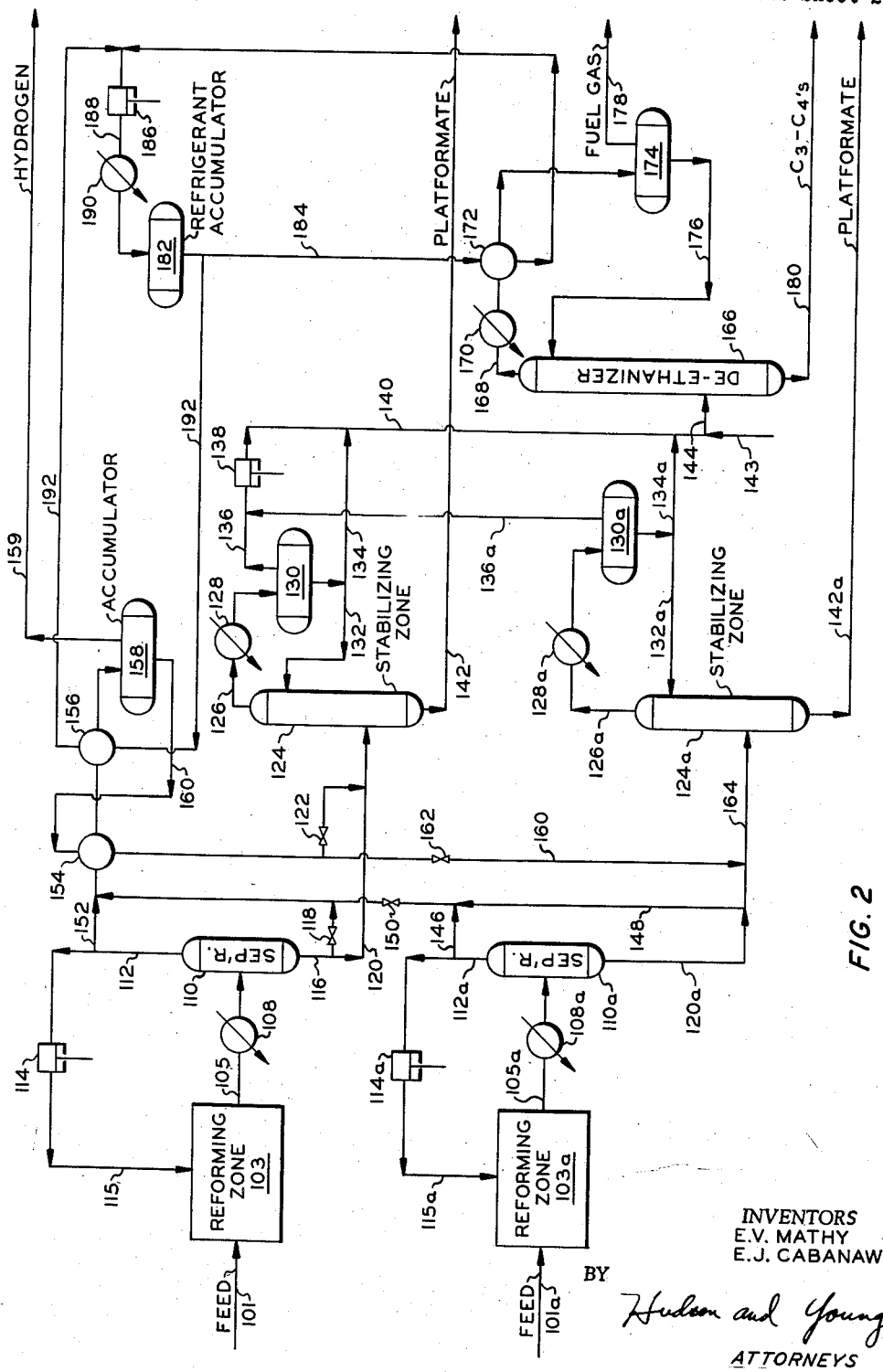

In order to more clearly describe the invention and provide a better understanding thereof, reference is had to the accompanying drawings of which:

Figure 1 is a diagrammatic illustration of a unit suitable for carrying out the invention comprising two reforming zones, two separation zones, two stabilizing zones, an accumulation zone, and a de-ethanizing zone, with associated equipment such as coolers, pumps, compressors, etc. and Figure 2 is a similar unit suitable for carrying out other embodiments of the invention.

Referring to Figure 1, two naphtha feed materials are introduced to reforming zones 4 and 4a through conduits 2 and 2a, respectively. Within these zones, the hydrocarbon fractions are subjected to reforming conditions in the presence of hydrogen introduced through conduits 100 and 104, respectively. The product is removed from the reforming zones through conduits 6 and 6a, passes through coolers 8 and 8a and exchangers 10 and 10a and is introduced to separators 12 and 12a. In these vessels sufficient residence time is provided to allow separation of the vapors from the liquid portion of the reforming products. The separator vapors, which comprise hydrogen and various light hydrocarbons, are removed overhead through conduits 46 and 60, respectively, combined with the liquid from the separator 12a in conduit 66 and the combined stream is passed through cooler 48 and into accumulator 50. Due to the reduction in temperature and the equilibrium established by the combination of vapors and single separator liquid a substantial portion of the lighter hydrocarbons pass into the liquid phase thus providing a cooled vapor substantially increased in hydrogen content. This vapor material is withdrawn overhead from the accumulator through conduit 96 and is divided, with a portion being yielded as net hydrogen through conduit 98 and the remainder passing through conduits 100 and 104 and compressors 102 and 106 as recycle to the reforming zones. The accumulator liquid is removed therefrom through conduit 152, passed through exchangers 10 and 10a and is introduced through valve 44 to stabilizing zone 14a. At the same time, liquid from separator 12 passes through conduits 34 and 38 into stabilizing zone 14. Within the stabilizing zones separation is effected between the liquid gasoline products and lighter hydrocarbons. The two gasolines are separately removed from the unit as products of the two processes through conduits 69 and 69a, respectively. The separated gases pass overhead through conduits 16 and 16a, condensers 18 and 18a and enter accumulators 20 and 20a. A portion of each condensate is returned to the stabilizing zones as reflux through conduits 22 and 22a and the excess condensates are combined through conduits 24 and 24a, passing into de-ethanizer 70. The uncondensed portions of the stabilizing zone overhead gases are also combined, through conduits 26 and 26a, are compressed in compresser 28 and introduced to de-ethanizer 70. Within the de-ethanizer a further separation is made between the light hydrocarbons to provide an overhead stream comprising ethane and lighter hydrocarbons and a bottoms product containing 3 to 4 carbon atoms per molecule, the latter material being removed from the de-ethanizer through conduit 72. The de-ethanizer overhead is taken through conduit 74, condensers 76 and 78 and enters accumulator 80. The condensate is returned to the de-ethanizer as reflux through conduit 82 and fuel gas is yielded through conduit 84.

A refrigerating system is included as part of the aforedescribed unit and comprises a refrigerant accumulator 86, a compressor 90 and a condenser 92. Refrigerated material is utilized for condensing the overhead from the de-ethanizer through conduit 88 and condenser 78 and cooling the combined separator liquid and hydrogen streams through conduit 94 and cooler 48.

As an alternate method of operation, separator 12a can be by-passed and thus eliminated by closing valve 55, opening valve 56 and passing the total effluent from reforming zone 4a through control valve 58 for combination with the gases from separator 12.

Referring to Figure 2, which illustrates further aspects of the invention, separate feed materials are introduced to reforming zones 103 and 103a through conduits 101 and 101a, respectively. The effluent streams from the reforming zones are cooled and passed to separators 110 and 110a. In this embodiment of the invention the gases from each of the separators are divided with a portion being compressed in compressors 114 and 114a and recycled to the reforming zones 115 and 115a. The remainder of the separator gases are then combined with the liquid from one of the separators and treated in accordance with the operation of Figure 1. The higher purity hydrogen which is obtained in this operation is yielded from the process. The accumulator liquid is stabilized in one of the stabilizing zones and the unused separator liquid is introduced to the other stabilizing zone. In this embodiment, the stabilizing zone overhead vapors and liquids are combined and introduced to the de-ethanizer 166 as a single feed stream. The remainder of the process, including the refrigeration cycle, is carried out in a manner similar to the process of Figure 1.

The preceding discussion has been directed to the variout preferred embodiments of the invention, however, it is not intended that the drawings or the discussion thereof in any way limit the scope of the invention and it is to be understood that modifications and variations of the processing equipment and the operation thereof within the skill of the art can be employed.

The following data is presented in illustration of an amplification of a preferred embodiment of the invention on a commercial scale:

Example

| | Lb./hr. |
|---|---|
| Flows: | |
| Feed to reforming zone (2) | 201,000 |
| Composition— | |
| Hydrocarbons wt. percent | 64.7 |
| Recycle gas [1] do | 35.3 |
| Feed to reforming zone (2a) | 231,000 |
| Composition— | |
| Hydrocarbons wt. percent | 60.6 |
| Recycle gas [1] do | 39.4 |
| Separator overhead to accumulator (60) | 110,000 |
| Separator overhead to accumulator (46) | 85,000 |
| Separator liquid to accumulator (66) | 80,000 |
| Accumulator liquid to stabilizing zone (52) | 104,000 |
| Accumulator vapors (96) | 171,000 |
| Composition— | |
| Hydrocarbons vol. percent | 8.0 |
| Hydrogen do | 92.0 |
| Separator liquid to stabilizing zone (34) | 116,000 |
| Platformate yield (69) | 110,000 |
| Platformate yield (69a) | 120,000 |
| Feed to de-ethanizer | 31,000 |
| Composition— | |
| Stabilizing zone accumulator gas: | |
| (26) | 3,500 |
| (26a) | 4,500 |
| Stabilizing zone accumulator liquid: | |
| (24) | 11,000 |
| (24a) | 12,000 |
| Fuel gas (84) | 6,000 |
| De-ethanizer bottoms (72) | 25,000 |
| Temperatures: | °F. |
| Reforming zone (4) | 970 |
| Reforming zone (4a) | 960 |
| Separator (12) | 80 |
| Separator (12a) | 90 |
| Accumulator (50) | 50 |
| Stabilizing zone (14) (top) | 160 |
| Stabilizing zone (14a) (top) | 160 |
| De-ethanizer (70) (top) | 120 |
| Pressures: | P.s.i.g. |
| Reforming zone (4) | 350 |
| Reforming zone (4a) | 550 |
| Separator (12) | 300 |
| Separator (12a) | 500 |
| Accumulator (50) | 280 |
| Stabilizing zone (14) | 175 |
| Stabilizing zone (14a) | 175 |
| De-ethanizer (70) | 500 |

[1] Recycle gas containing about 92% by volume hydrogen plus light hydrocarbons.

Having thus described the invention by providing a specific example thereof, it is to be understood that no undue limits or restrictions are to be drawn by reason thereof and that many variations and modifications thereof are within the scope of the invention.

I claim:

1. In a process for the catalytic reforming of naphtha wherein a first naphtha fraction is passed into a first reforming zone under reforming conditions in the presence of hydrogen to produce a first effluent containing hydrogen, light hydrocarbons and gasoline hydrocarbons, said first effluent is cooled and separated into a first gas stream containing hydrogen and light hydrocarbons and a first liquid stream containing light hydrocarbons and gasoline hydrocarbons, said first liquid stream is stabilized to produce a first overhead product of light hydrocarbons and a first gasoline product, and said first overhead product is passed to a deethanizer column wherein ethane is separated from propane and butane, the improvement which comprises passing a second naphtha fraction to a second reforming zone under reforming conditions differing from the conditions of said first zone in the presence of hydrogen to produce a second effluent containing hydrogen, light hydrocarbons and gasoline hydrocarbons, contacting said first gas stream with said second effluent at a temperature below that at which said first effluent is separated to produce a second gas stream containing more hydrogen and less hydrocarbon than said first gas stream and a second liquid stream containing gasoline hydrocarbons and more light hydrocarbons than said second effluent, stabilizing said second liquid stream to produce a second overhead product of light hydrocarbons and a second gasoline product, passing said second overhead product to said deethanizer column with said first overhead product for separation of ethane from propane and butane and recycling a portion of said second gas stream to each of said reforming zones.

2. The process of claim 1 wherein said second reforming zone is operated at a higher pressure than said first reforming zone.

References Cited in the file of this patent

UNITED STATES PATENTS

| 2,322,863 | Marschner et al. | June 29, 1943 |
| 2,485,073 | Shiffler et al. | Oct. 18, 1949 |
| 2,580,478 | Stine | June 1, 1952 |